3,016,367
POLYMERIZATION OF PYRROLIDONE AND PI-PERIDONE EMPLOYING N,N-DISUBSTITUTED SULFONAMIDES AS CHAIN INITIATORS
Samuel A. Glickman, Easton, and Edgar Shelley Miller, Bethlehem, Pa., assignors to General Aniline & Film Corporation, New York, N.Y., a corporation of Delaware
No Drawing. Filed Apr. 4, 1958, Ser. No. 726,334
6 Claims. (Cl. 260—78)

The present invention relates to the polymerization of 5- and 6-membered lactams, such as pyrrolidone and piperidone.

The polymerization of a lactam, such as pyrrolidone, proceeds via a ring-chain polymerization to give polyamides of 4-aminobutyric acid. Thus:

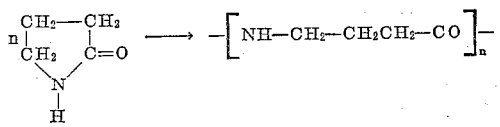

The recurring unit is one which might hypothetically arise in the condensation polymerization of 4-aminobutyric acid. However, early investigators, namely Gabriel (Berichte 32, 1266 (1899)) and Schotten (Berichte 21, 2240 (1880)), observed that 4-aminobutyric acid and 5-aminovaleric acid failed to undergo intermolecular condensation and yielded only the five and six-membered lactams. The first disclosure of such polyamides was that of U.S.P. 2,638,463 (W. O. Ney, W. R. Nummy and C. E. Barnes—May 12, 1953), involving the polymerization of pyrrolidone in the presence of an alkaline polymerization catalyst.

While useful polymers are obtained by the process described in the Ney, Nummy and Barnes patent, No. 2,638,463, considerable difficulty is encountered in obtaining these polymers in satisfactory yields; and, also, in the production of polymers having relatively high molecular weights. Patent No. 2,739,959, of Ney and Crowther, which, in Example I, discloses that only a small yield of low molecular weight polymer may be obtained when an alkaline polymerization catalyst is employed as the sole promoter of the polymerization of pyrrolidone, discloses effecting the alkaline polymerization of the lactam in the presence of a small amount of an acyl compound, as an activator for the alkaline polymerization catalyst; and, preferably, carrying out the polymerization of a lactam while dispersed in an anhydrous hydrocarbon non-solvent therefor, in order to increase the yield and molecular weight of the polymer. The specific activators described in Patent No. 2,739,959, as having the property of increasing the rate of polymerization of lactams having 5- and 6-membered rings, are acyl pyrrolidones, acyl dipyrrolidones, organic peroxides, anhydrous lactones, and alkyl esters. The Ney and Crowther patent discloses the use of these acyl compounds as activators for the alkaline polymerization catalyst.

We have now found that a particular class of N,N-disubstituted sulfonamides are capable of acting as chain initiators in the alkaline catalyzed polymerization of 5- and 6-membered lactams; e.g., of pyrrolidone and piperidone. This particular class of N,N-disubstituted sulfonamides has the role of initiating chain growth, whereby a novel type of polymer is produced. This novel class of N,N-disubstituted sulfonamides actually enters into the polymer chain. This function as a chain initiator is evidenced by the employ of a bromine containing precursor, wherein as more fully described hereinafter, the use of para bromo-phenylsulfonyl chloride resulted in a polymer containing bromine in an amount calculated for on the basis of its complete entry into the polymer as a chain initiator.

The particular class of N,N-disubstituted sulfonamides which we have found to be useful for initiating the alkaline catalzed polymerization of pyrrolidone and piperidone, are those having the following general formula:

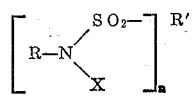

As indicated, the role of this substance is that of initiating chain growth, and, as a result, the group

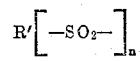

of the N,N-disubstituted sulfonamide enters into the molecule of the polymer which is produced so that a novel polymer of the following general formula is obtained:

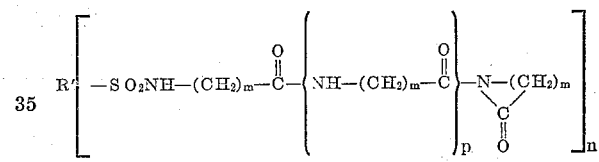

In the foregoing formulae and in other formulae appearing in this specification, the groups shown have the following meanings:

R=alkyl, aryl
R'=alkyl, aryl, alkylene, arylene
X=alkylsulfonyl, arylsulfonyl, acyl, carbalkoxy, carbanilino
$m=3$ or $4$
$n=1$ to $3$
$p=$an integer average from 1 to 1000
R+X=keto alkylene group to complete a ring (2-pyrrolidone, 2-piperidone, E-caprolactam)
R'+X=may complete a ring via a

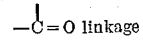 linkage

N,N-disubstituted sulfonamides of the class described above, which are useful for initiating the alkali catalyzed polymerization of pyrrolidone and piperidone, may readily be prepared in most instances by the reaction of a mono- or poly-sulfonyl halide with an appropriate compound designated as X—NH—R, as the alkali metal salt or in the presence of an alkaline agent. Thus:

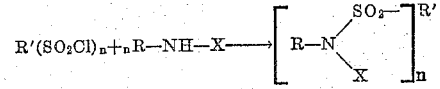

Specific compounds in the above class, which are useful as chain initiators, are shown in the following table:

| Compound | R | R' | X | R+X | R'+X | Preparation Lit. Reference |
|---|---|---|---|---|---|---|
| N-acetylbenzenesulfonanilide | Phenyl | Phenyl | Acetyl | | | J. Chem. Soc., 1947, 382. |
| N-Carbethoxybenzenesulfonanilide | do | do | Carbethoxy | | | Benzene-sulfonyl chloride on Sodiophenyl urethane—based on Ber. 37, 3681—M.P. 106-111° C. |
| N-Carbethoxyethylsulfonanilide | do | Ethyl | do | | | Ethyl-sulfonyl chloride on sodio phenyl urethane—based on Ber. 37, 3681. |
| N-ethyl-di-(benzene-sulfon)-imide | Ethyl | Phenyl | Benzene-sulfonyl | | | Ber. 38, 909. |
| N-ethyl-di-(ethyl-sulfon)-imide | do | Ethyl | Ethyl-sulfonyl | | | Based on Ber. 38, 909. |
| N-Carbethoxyethylsulfonanilide | Phenyl | do | Carbethoxy | | | Ethyl sulfonyl chloride on sodio phenyl urethane—based on Ber. 37, 3681. |
| N-p-toluene-sulfonyl-2-pyrrolidone | | p-Toluene-sulfonyl | | $\overset{\mid}{\underset{\mid}{C}}=O$ $(CH_2)_3$ | | Annalen 596, 201. |
| N-p-toluene-sulfonyl-2-piperidone | | do | | $\overset{\mid}{\underset{\mid}{C}}=O$ $(CH_2)_4$ | | p-Toluene-sulfonyl chloride and 2-piperidone. |
| N-p-toluene-sulfonyl-E-caprolactam | | do | | $\overset{\mid}{\underset{\mid}{C}}=O$ $(CH_2)_5$ | | p-Toluene-sulfonyl chloride and E-caprolactam. |
| N,N'-1,2-ethane-disulfonyl-bis pyrrolidone. | | $-(CH_2)_2-$ | | $\overset{\mid}{\underset{\mid}{C}}=O$ $(CH_2)_3$ | | 1,2-Ethane disulfonyl chloride and sodio pyrrolidone. |
| N,N'-1,3-benzene-di-sulfonyl-bis pyrrolidone. | |  | | $\overset{\mid}{\underset{\mid}{C}}=O$ $(CH_2)_3$ | | m-benzene disulfonyl chloride and sodio pyrrolidone. |
| N,N',N''-1,3,5-Naphthalene-trisulfonyl-tris pyrrolidone. | | 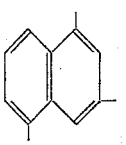 | | $\overset{\mid}{\underset{\mid}{C}}=O$ $(CH_2)_3$ | | 1,3,5-naphthalene-trisulfonyl chloride and sodio pyrrolidone. |
| N,N'-Diphenyl-N-benzene-sulfonyl urea. | Phenyl | Phenyl | Carbanilino | | | Sodium N-phenyl-benzene-sulfonamide and phenyl isocyanate. |
| N-Ethyl Saccharin | Ethyl | | | | 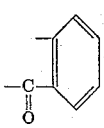 | J.A.C.S. 45, 2696 (1923). |

It has been found that the N,N-disubstituted sulfonamides which are effective for chain initiating the alkali catalyzed polymerization of pyrrolidone and piperidone, must be those of the general formula indicated above.

This specificity of substitution, requiring an N,N-disubstituted sulfonamide of the class indicated, may be shown by a consideration of the employ of other compounds. Polymerizations attempted using $C_6H_5NHCOOC_2H_5$ (N-phenyl urethane), as a chain initiator, were unsuccessful, whereas the substitution of a phenylsulfonyl radical to give N-carbethoxybenzenesulfonanilide, led to a material capable of chain initiating the polymerization. In a similar fashion, $C_6H_5NHCOCH_3$ (acetanilide) failed as a chain initiator; and whereas the phenylsulfonyl substitution product, N-acetyl benzenesulfonanilide, demonstrated chain initiator activity.

The attempted polymerization of highly purified pyrrolidone, by means of an alkaline catalyst alone fails to give anything more than traces of polymer (in the order of 1% or less). The use in small amounts of an arylsulfonyl derivative,

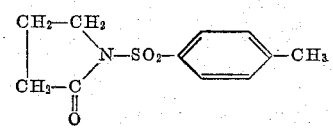

named N-p-toluenesulfonyl-2-pyrrolidone, causes the polymerization to ensue. This, in addition to the cases reported above, demonstrates the requirement as to the specific nature of the substituted ureas which show chain initiator activity.

Whereas the above designation of certain N,N-disubstituted sulfonamides as chain initiators has been made, it has been shown that substances (herein called chain initiator precursors) capable of forming in situ substituted sulfonamides related to pyrrolidone may act to initiate the polymerization of alkaline pyrrolidone solutions. Thus, the organic sulfonyl chlorides as a class react with pyrrolidone or piperidone to form sulfonyl derivatives and demonstrate chain initiator activity. For example, p-toluenesulfonyl chloride, reacting with pyrrolidone to form in situ N-p-toluenesulfonyl-2-pyrrolidone, acts as a chain initiator. Examples of other sulfonyl chlorides which result in the successful polymerization of pyrrolidone by forming in situ compounds of the class of N,N-disubstituted sulfonamides include benzene sulfonyl chloride, ethyl sulfonyl chloride.

The use of di- and poly-sulfonyl chlorides as chain initiators has made possible the preparation of high molecular weight polypyrrolidone since each sulfonyl chloride function serves to initiate a single chain. Thus, in the use of ethane-1,2-disulfonyl chloride the polymer chains are linked through a group consisting of $$-SO_2-CH_2-CH_2-SO_2$$

In a similar fashion, there may be employed other polysulfonyl halides such as m-benzene disulfonyl chloride, 1,5-naphthalene disulfonyl chloride, 1,3,5-naphthalene trisulfonyl chloride and the like.

It had been noted that the molecular weight of the polymer and its yield depended on the molar quantities of the chain initiator employed. In the employ of the polyfunctional sulfonyl chlorides above, the use of a given molar quantity resulted in a higher molecular weight than that achieved with the same molar quantity of a monofunctional sulfonyl chloride, such as benzene sulfonyl chloride. The advantage is considerable where one is seeking material of a high molecular weight.

The general conditions and factors utilized for polymerizing 5- and 6-membered lactams, pursuant to the present invention, may be those mentioned in U.S. Patent No. 2,739,959, except for the presence of an N,N-disubstituted sulfonamide, as the chain initiator for the polymerization, in place of the activators specified in that patent. In general, the method of effecting polymerization of 5- and 6-membered ring lactams, by the process of the present invention, is as follows:

Initially, there is the preparation of an anhydrous solution of the alkali pyrrolidone in pyrrolidone. The alkali pyrrolidone usually employed is sodio or potassio pyrrolidone, and may be obtained via the reaction of pyrrolidone with sodium and potassium metal or the respective hydroxides. In the latter case, it is essential to remove the water formed thereby as rapidly as possible. The concentration of the alkali pyrrolidone employed in many instances may vary from 0.5 to 5.0 mole percent (percentages based on pyrrolidone), and may range from 0.1 to 10.0 mole percent. In series of experiments, optimum yields were obtained with about 1.25 mole percent of alkali pyrrolidone. The role of the alkali pyrrolidone is that of a catalyst and serves as a source of pyrrolidone anions.

The amount of chain initiators employed in many instances may vary from 0.1 to 10.0 mole percent (percentage based on pyrrolidone). The concentration of chain initiator chosen, will depend on the conversion desired, and the molecular weight sought. The rate of the polymerization will depend, to a large extent, on the molar amount of chain initiator employed, the higher rates obtained by the use of greater amounts of chain initiator. The polymerizations may be chain initiated at temperatures from 25° C. to 65° C. and are accompanied by a mild exothermic reaction.

In a bulk or mass polymerization, the addition of the chain initiator is followed by a thickening of the solution and gradual solidification of the mixture. The toughness of the cake will, obviously, depend on the extent of the conversion and will be dependent on the times involved and amounts of chain initiators used.

The polymerization employing the foregoing chain initiators may be conducted on a dispersion of pyrrolidone, and the alkali pyrrolidone in a non-solvent for the pyrrolidone. Applicable non-solvents fall in the class of saturated and olefinic aliphatic alicyclic hydrocarbons, i.e., pentane, hexane, heptane, cyclohexane, pentene, cyclohexene, etc. The amount of non-solvent frequently employed is 1 to 3 parts of non-solvent per unit weight of pyrrolidone, but is subject to wide variation. The physical state of the resulting polymer obtained, via a dispersion polymerization may vary from a thick curd to a fine powder, depending on conversion desired, ratio of non-solvent and type as well as rate of agitation.

For the purposes of comparison, there are given below, as Examples A and B, illustrations of the prior art polymerization of highly purified pyrrolidone, from the same batch, and purified in the same manner as the pyrrolidone used in the examples appearing later in the specification of the process of the present invention:

*Example A*

A 500 cc. glass flask was charged with 100.0 grams (1.18 moles) of highly purified pyrrolidone. There is added 1.0 gram of potassium hydroxide flakes of 83% assay, the system immediately placed under a reduced pressure of 10 m. and rapidly heated to the reflux point of 120 to 125° C. The vapors were condensed in a vertical reflux condenser, maintained at a jacket temperature of 75° C., thus permitting the return of the pyrrolidone and, at the same time, effecting the removal of water. After one hour at the reflux point, the reaction mixture in the still pot was cooled and the clear, colorless solution of potassio pyrrolidone in pyrrolidone allowed to stand for 24 hours at room temperature to the exclusion of atmospheric moisture and carbon dioxide. During the 24-hour period, the mixture became turbid and a scant amount of solid was deposited. The mixture was treated with 400 grams of distilled water, the solid filtered and thoroughly washed with water. The dried polymer weighed 0.6 gram, representing a conversion of 0.6%. The material was of low molecular weight, as indicated by the relative viscosity of a 1% solution in meta cresol.

*Example B*

This example is an illustration of an alternate polymerization of highly purified pyrrolidone, and closely follows Example 1, of U.S. Patent No. 2,739,959, which is also an illustration of prior art polymerization of pyrrolidone.

A 500 cc. glass flask, equipped for vacuum distillation, was charged with 120.0 grams of highly purified pyrrolidone. There is added 1.0 gram of potassium hydroxide flakes of 83% assay. The system was immediately placed under a reduced pressure of 1.0 mm. and rapidly heated to effect the distillation at 90 to 100° C. of 20 grams of pyrrolidone and water. The resulting clear, colorless solution in the still pot constitutes a solution of potassio pyrrolidone in pyrrolidone. The solution was allowed to cool to room temperature and stand for 24 hours to the exclusion of atmospheric moisture and carbon dioxide. During this 24-hour period the mixture became turbid and a scant amount of solid was deposited. The contents was treated with 400 grams of distilled water, the solid filtered and thoroughly washed with water. The dried polymer weighed 0.5 gram, representing a conversion of 0.5%. The material was of low molecular weight as indicated by the relative viscosity of a 1% solution in meta cresol.

The details of the present invention will be apparent to those skilled in the art, from the following specific examples, of preferred methods of practicing the same:

*Example I*

A 300 cc. glass flask was charged with 50 grams (0.59 mole) of highly purified pyrrolidone. There was then added 0.5 gram of potassium hydroxide flakes of 83% assay, and the mixture immediately placed under a reduced pressure of 10 mm. and rapidly heated to the reflux point of 120–125° C. The vapors were condensed in a vertical reflux condenser, maintained at a jacket temperature of 75° C., thus permitting the return of the pyrrolidone, and, at the same time effecting the removal of water. After one hour at the reflux point, there was obtained a clear colorless solution of potassio pyrrolidone. To this solution at 50° C. was added 0.90 gram (0.003 mole) of N-carbethoxy benzenesulfonanilide

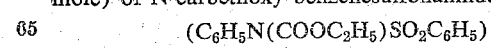
$(C_6H_5N(COOC_2H_5)SO_2C_6H_5)$

M.P. 106–111° C., prepared by the reaction of benzenesulfonyl chloride with sodium N-phenyl urethane according to the procedure of Diels and Nawiasky, Berichte 37, 3681. The molar concentration of the chain initiator is 0.5% based on the pyrrolidone. The solution became cloudy immediately and gradually thickened to a rigid gel. Precautions were taken to exclude moisture and carbon dioxide. After 18 hours, the solid mass was removed from the flask, thoroughly triturated with methanol to removal unreacted pyrrolidone and then dried in vacuum oven to constant weight. There was obtained 14 grams of white solid polymer, representing a conversion of 28%. The relative viscosity of 1% solution in meta cresol was 1.77, and the solid had an M.P. of 254°–256° C. The thus obtained polymer had the following formula:

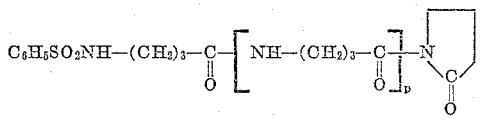

As an illustration of the specificity of substitution required in the N,N-disubstituted sulfonamides used as the chain initiator, the foregoing example was repeated, using 1.0 gram (0.0059 mole) of ethyl N-phenyl urethane, in place of N-carbethoxy benzenesulfonanilide. Ethyl N-phenyl urethane represents the compound where the phenylsulfonyl group is replaced by a hydrogen on the amide nitrogen of the N,N-disubstituted sulfonamide. There was obtained some 3.0 grams of solid representing a 6% conversion to low molecular weight material.

*Example II*

A solution of potassio pyrrolidone in 50 grams (0.59 mole) of pyrrolidone was prepared as described in Example I. To this solution at 50° C., was added 1.75 grams (0.005 mole) of N,N'-diphenyl-N-benzenesulfonyl urea, M.P. 107–110° C., prepared by the reaction of N-phenylbenzenesulfonanilide and phenyl isocyanate. The molar concentration of the chain initiator was 0.84%. After an 18 hour period, during which moisture and carbon dioxide were excluded, the contents which had solidified to a hard solid, was treated with 200 grams of 90% formic acid. The solid dissolved in the course of 24 hours to give a viscous solution. The latter solution was slowly poured into one l. of ice and water and allowed to precipitate completely. The resulting polyamide polymer was filtered, washed free of formic acid by means of water and dried. The conversion was 58% to a polymer, M.P. 253–256° C. with a relative viscosity of 1.98 as a 1% solution in m-cresol.

As a further illustration of the specificity of substitution required in the chain initiator, the foregoing experiment was repeated, except that, in place of the N,N'-diphenyl-N-benzenesulfonyl urea, there was used 1.10 grams (0.005 mole) of 1,3-dipenhyl urea. The latter compound represents the material wherein the phenylsulfonyl group of the N,N-disubstituted sulfonamide is replaced by a hydrogen atom. The scant amount of dry polymer obtained represented a 0.5% conversion to low molecular weight material.

*Example III*

A solution of potassio pyrrolidone in 50 grams (0.59 mole) of pyrrolidone was prepared as described in Example I. To this solution at 50° C. was added 0.83 gram (0.003 mole) of N-acetyl-benzenesulfonanilide, prepared according to the procedure given in Journal of the Chemical Society 1947, 382. The molar concentration of the chain initiator was 0.5 mole percent. The solution became turbid within 10 minutes of the addition and gradually became a soft gel which hardened on standing. After a 24 hour period, during which moisture and carbon dioxide were excluded, the solid contents were treated with water. The filtered, thoroughly washed material was vacuum oven dried at 80° C. to give 16.5 grams of white polymeric polyamide, M.P. 252–254° C., of the structure shown in Example I.

To further illustrate the specificity of substitution required of a chain initiator, the foregoing experiment was repeated, except that, in place of the above chain initiator, there was employed an equimolar amount of acetanilide. The latter compound represents the material wherein the phenylsulfonyl group has been replaced by a hydrogen atom. Only a scant amount of low molecular weight material was obtained.

*Example IV*

A solution of potassio pyrrolidone in 100 grams (1.18 moles) of pyrrolidone was prepared as described in Example I. To the above, at 50° C., was added 2.9 grams (0.012 mole) of N-p-toluenesulfonyl-2-pyrrolidone (Reppe, Annalen 596, 201). In the course of 5 minutes the contents became a soft gel, which hardened progressively during the following 24 hours. Precautions were taken to exclude moisture and carbon dioxide. The resulting white solid was treated with 350 grams of 90% formic acid and during the course of stirring for 24 hours yielded a very viscous solution. The polyamide polymer was obtained by pouring the polymer solution slowly onto 2500 grams of ice and water, filtration, thorough washing to remove formic acid and dried in a vacuum oven at 80° C. A conversion of 78 grams of M.P. 254–256° C. and a relative viscosity of 2.75 for a 1% solution in m-cresol. The polymer has the formula:

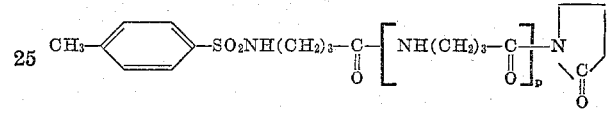

In the foregoing Examples I to IV inclusive, the N,N-disubstituted sulfonamide, employed as the chain initiator, was pre-formed, and added to the solution of potassio pyrrolidone in pyrrolidone. However, as previously indicated, an N,N-disubstituted sulfonamide, which is used as the chain initiator, may be formed in situ by adding a sulfonyl chloride to the solution of potassium pyrrolidone in pyrrolidone. This method of operation is described in the following example.

*Example V*

A 300 cc. glass flask was charged with 50 grams (0.59 mole) of highly purified pyrrolidone. There is added 0.75 g. of potassium hydroxide flakes of 83% assay, the system immediately placed under a reduced pressure of 10 mm. and rapidly heated to the reflux point 120–125° C. The vapors were condensed in a vertical reflux condenser, maintained at a jacket temperature of 75° C., thus permitting the return of the pyrrolidone and at the same time effecting the removal of water. After one hour at the reflux point, the reaction mixture in the still pot was cooled to 30° C. and there was added 0.88 gram (.005 mole) of benzenesulfonyl chloride. Within five minutes the mixture was a soft gel and in the course of fifteen minutes became a dry gel and the temperature rose to 55° C. The material was allowed to stand for 24 hours to the exclusion of moisture and carbon dioxide. The contents were removed from the flask, thoroughly triturated with water and methanol to remove excess pyrrolidone. The white polymeric polyamide was dried in a vacuum oven at 80° C. to give 19.7 g. of material melting at 252–254° C. and possessing a relative viscosity of 1.85 for a 1% solution in m-cresol.

*Example VI*

The following example illustrates the employ of heptane as the medium for the non-solvent suspension polymerization of pyrrolidone using an arylsulfonyl chloride as the chain initiator precursor.

A 500 cc. flask was charged with 120 grams of highly purified pyrrolidone. There is added 2.0 grams of potassium hydroxide flakes of 83% assay and the system immediately placed under a reduced pressure of 10 mm. In rapid fashion, at total take-off, there was distilled 20 grams of pyrrolidone at 125° C. to ensure the removal of water. The remaining 102 grams of a solution of potassio pyrrolidone in pyrrolidone was cooled to 30° C. The solution from above was added to 200 grams of anhydrous heptane in a suitable equipped reaction vessel. To the rapidly agitated mixture at 30° C. was added 1.06 g. (.006 mole) of benzenesulfonyl chloride. The temperature rose to 35° C. in the course of five minutes and the nature of the suspended liquid changed to that of a soft white curd. The mixture gradually became a suspension of finely divided white solid in the course of 24 hours' stirring at high speeds. The solid was filtered, suspended in 300 ml. of methanol to remove excess pyrrolidone, washed thoroughly to remove alkali and dried ta 80° C. in a vacuum oven. The resulting white polyamide, M.P. 254–256° C. was obtained in a conversion of 50%, with a relative viscosity of 3.37 for a 1% solution in m-cresol.

The following example, utilizing p-bromobenzenesulfonyl chloride indicates clearly the chain initiating role it plays in the polymerization. A bromine analysis in the resulting polymeric polyamide permits a calculation which shows virtually complete entry into the polymer chain of the bromine containing material, presumably as the initiating molecule.

*Example VII*

A 500 cc. glass distilling flask was charged with 120 grams of highly purified pyrrolidone. There is added 2.2 grams of potassium hydroxide flakes of 83% assay and the system immediately placed under a reduced pressure of 10 mm. In rapid fashion, at total take-off, there was distilled 20 grams of pyrrolidone at 125° C. to ensure the removal of water. The remaining 102 grams of a solution of potassio pyrrolidone in pyrrolidone was cooled to 30° C.

The solution from above was added to 200 grams of anhydrous heptane in a suitably equipped reaction vessel. To the rapidly agitated mixture at 30° was added 2.04 grams (0.008 mole) of p-bromobenzenesulfonyl chloride. In the course of 10 minutes the temperature rose to 36° C. and the formation of a white curd was noted. The mixture was stirred for 24 hours to the exclusion of moisture and carbon dioxide at a temperature of about 30–32° C. The suspension of white solid was filtered, triturated well with methanol and thoroughly washed with water to remove alkali and inorganic materials. The white solid was dried in a vacuum oven at 80° to give 60 grams of material, M.P. 252–254° C., with a relative viscosity of 2.75 for a 1% solution in m-cresol. The bromine analysis, conducted on a semi-micro scale was 1.04%, indicating that 97% of the bromobenzenesulfonyl chloride had entered the polymer chain, presumably as the chain initiator. The thus obtained polymer had the following formula:

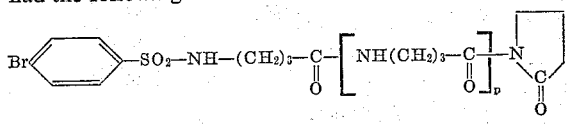

The use of a difunctional chain initiator precursor, in this case represented by ethane 1,2-disulfonyl chloride, is shown below. The employ of a difunctional agent leads to polymers with a higher molecular weight at a given conversion than the corresponding polymer obtained through the use of a monofunctional chain initiator at the same conversion.

*Example VIII*

A solution of potassio pyrrolidone in 100 grams (1.18 moles) of highly purified pyrrolidone was prepared according to Example VI using 2.0 grams of potassium hydroxide flakes of 83% assay. This solution was then added to 200 grams of anhydrous heptane in a suitably equipped reaction vessel. To the rapidly agitated mixture at 30° C. was added 0.68 gram (0.003 mole) of ethane 1,2-disulfonyl chloride. The temperature rose to 36° C. in the course of five minutes and the pyrrolidone was replaced by a soft white curd. In the course of the next 24 hours, the mixture became a finely divided suspension of white solid. Precautions were taken to exclude moisture and carbon dioxide during this interval. The mixture was then filtered and the solid triturated with 350 ml. of methanol followed by water washing and 80° C. vacuum oven drying. There was obtained 52 grams of material, M.P. 252–255° C. with a relative viscosity of 4.30 for a 1% solution in m-cresol. The thus obtained polymer had the following formula:

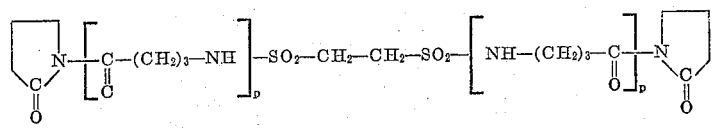

*Example IX*

The procedure of Example VIII was repeated employing as the difunctional chain initiator precursor m-benzenedisulfonyl chloride. The employ of 0.25 mole percent gave conversion of 48% to a polyamide possessing a relative viscosity of 4.21 for a 1% solution in m-cresol.

The above illustrated further the effect of a polyfunctional chain initiator in achieving material of high molecular weight, employing but small amounts of chain initiator precursor. The polymer has the formula:

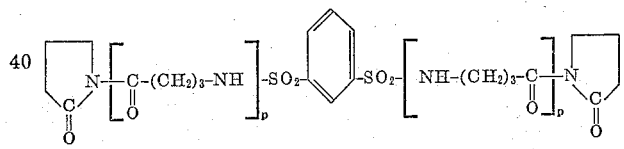

*Example X*

The following demonstrates the use of a difunctional chain initiator, N,N′-1,3-benzenedisulfonyl-bis-pyrrolidone, prepared by the reaction of m-benzenedisulfonyl chloride and a dispersion of potassio pyrrolidone in toluene.

A solution of potassio pyrrolidone in pyrrolidone was prepared as described in Example I employing 100 grams (1.18 moles) of pyrrolidone and 2.0 grams of potassium hydroxide flakes of 83% purity. To this solution, at 50° C. was added 1.10 grams (0.003 mole) of N,N′-1,3-benzenedisulfonyl-bis-pyrrolidone. The molar concentration of chain initiator is 0.25 mole percent based on pyrrolidone. The solution became turbid shortly after the addition and in the course of one hour was a soft gel with the temperature having risen to 53° in that interval. The mixture was allowed to stand for 48 hours to the exclusion of moisture and carbon dioxide. The resulting solid was dissolved in 400 grams of 90% formic acid in the course of 24 hours. The viscous solution was then poured onto 2500 grams of ice and water and white solid filtered and thoroughly washed. There was obtained 53 grams of polyamide, M.P. 252–254° C., with a relative viscosity of 4.48 for a 1% solution in m-cresol. The structure of the polymeric material is similar to that shown in Example IX.

*Example XI*

The procedure of Example VIII was followed employing 1,3,5-naphthalenetrisulfonyl chloride as the trifunctional chain initiator precursor. The use of 0.2 mole percent of this trifunctional agent resulted in a conversion of 48% to a polyamide possessing a relative viscosity of 4.96 for a 1% solution in m-cresol.

The effect of a polyfunctional chain initiator in building up a high molecular weight material is shown by the above. In this case the polymerization proceeds from three active centers.

*Example XII*

The employ of an N-alkyl dibenzenesulfonimide is described below:

A one l. glass distilling flask was charged with 765 grams (9.0 moles) of highly purified pyrrolidone. There was then added 7.6 grams of potassium hydroxide flakes of 83% assay, and the mixture immediately placed under a reduced pressure of 10 mm. and rapidly heated to the reflux point of 124–126° C. The vapors were condensed in a vertical reflux condenser, maintained at a jacket temperature of 75° C. thus permitting the return of pyrrolidone, and, at the same time effecting the removal of water. After one hour, at the reflux point, there was obtained a clear colorless solution of potassio pyrrolidone.

The solution from above was added to 765 grams of anhydrous heptane in a suitably equipped reaction vessel. To the rapidly agitated mixture at 30° C. was added 14.5 grams (0.045 mole) of N-ethyl dibenzenesulfonimide (Berichte 38, 909). The temperature rose slightly and within fifteen minutes the formation of a soft white curd was noted. The mixture was allowed to stir for three days to the exclusion of moisture and carbon dioxide and yielded a finely divided white suspension. The material was filtered, triturated well with methanol and water, and dried at 80° C. in a vacuum oven. There was obtained 279.5 grams, for a conversion of 36.5%, of white solid, M.P. 254–256° C., having a relative viscosity of 2.53 for a 1% solution in m-cresol. The structure of the polyamide obtained is that shown in Example I.

*Example XIII*

A solution of potassio pyrrolidone in 50 grams (0.59 mole) of pyrrolidone was prepared as described in Example I. To this solution at 50° C., was added 0.63 gram (0.003 mole) of N-ethyl saccharin (Journal of the American Chemical Society 45, 2696 (1923)). The solution became turbid in the course of eleven minutes and progressively set to a soft gel in the course of the next eighteen hours. The material was removed from the flask, triturated well with methanol and water, and dried in a vacuum oven at 80° C. There was obtained an 11.8% conversion to polyamide of relative viscosity 1.34 for a 1% solution in m-cresol.

*Example XIV*

Charge a 500 cc. glass flask with 99.0 grams (1.0 mole) of highly purified piperidine. Add 2.0 grams of potassium hydroxide of 83% assay; place the system immediately under a reduced pressure of 5 mm. and rapidly heat to the reflux point (120–125° C.). Condense the vapors in a vertical reflux condenser maintained at a jacket temperature of 75° C., thus permitting the return of piperidone and, at the same time, effecting the removal of water. After one hour at the reflux point, cool the reaction mixture in the still pot to 50° C. and treat the colorless solution with 1.4 grams (0.005 mole) of m-benzenedisulfonyl chloride, corresponding to 0.5 mole percent chain initiator. The solution becomes a soft white mass in one hour and is allowed to stand for twenty-four hours to the exclusion of moisture and carbon dioxide. The solid is dissolved in 400 grams of 90% formic acid by stirring over a twenty-four hour period. The viscous solution is poured onto 2000 grams of ice and water and the precipitated solid filtered, thoroughly washed and dried in a vacuum oven at 80° C. The polyamide thus obtained is believed to possess the formula:

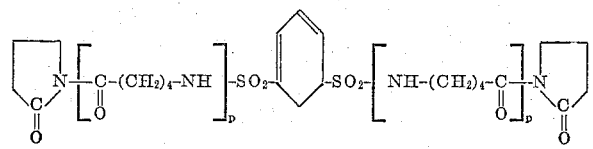

While an N-pyrrolidonyl, or N-piperidonyl group appears to be the usual chain-terminating group of the polymers obtained, pursuant to the present invention, it will be apparent to those skilled in the art, that the polymer chains may be otherwise terminated, for instance, by the formation of the acids and the metal and ammonium salts thereof, as well as esters and amides, which may arise by reaction of the active polymer intermediate with alkaline compounds, hydroxyl-containing compounds, or amines. Therefore, the polymers obtained, pursuant to the present invention, may, generically be represented by the following general formula:

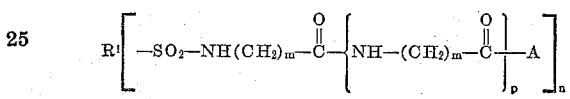

where "A" equals N-pyrrolidonyl, N-piperidonyl —NH—$(CH_2)_m$—COY radical; where $m$ equals 3 or 4; and "Y" represents oxymetal, hydroxyl, alkoxy, aryloxy, aralkoxy, oxyammonium, oxyaminium, amino, alkylamino, arylamino.

As examples of specific reagents, which may be employed to terminate the polymer chains, otherwise than in a pyrrolidonyl or piperidonyl radical, may be mentioned water, sodium hydroxide, sodium methylate, methanol, ethanol, phenol ammonia, ethylamine, aniline, diethanolamine. Reaction of the free polymer acid with alkaline agents such as metal hydroxides and amines gives the respective salts. The various terminations proceed through scission of the terminal pyrrolidone ring, or one of the polyamide linkages, particularly the linkage between the terminal pyrrolidonyl linkage and the carbonyl grouping linked thereto. Termination of the polymer chain by means of an ester, such as

may be accomplished by treatment of the polymer intermediate, with methanol. In a similar fashion, treatment of the polymer obtained in the hexane suspension polymerization with an amine, such as aniline, yields an amide terminated function, of the type

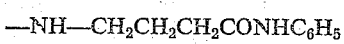

Hydrolysis of the terminal ring may be accomplished by treating the alkaline containing white solid, obtained in the polymerization, with water at 75–80° C. for one hour. The resulting product is terminated by a

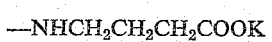

group conversion to the free acid, and, consequently to the other metal and ammonium salts, is accomplished by acidification and respective action of alkalizing agents.

The products of the present invention are, as indicated, polyamides of the nylon-4 type from pyrrolidone, or nylon-5 from piperidone; and, as such, are useful in the arts as in many applications of nylon. In particular, the products of the present invention, particularly those of relatively high molecular weight, e.g., products which have a relative viscosity of about 2.5 or higher, as a 1% solution in the m-cresol, are useful for the production of fibers for textile and other uses—e.g., as insulating blankets, etc. Fibers have been successfully produced from products of the present invention, by drawing from a melt and spinning from solutions, such as solution in formic acid, followed by evaporation of solvent. Useful films, having a wide variety of applications, may also be produced from the products of the present invention by melt-extrusion, by film-casting from solutions, such as a formic acid solution, glycolic or lactic acid solution, followed by removal of the solvent. Such films are useful in numerous applications, including electrical applications, as an insulator; as a base for industrial tapes; as a lining material or glass replacement, and in a variety of special packaging applications. The products of the present invention may also be used in plastic compression molding and extrusion molding applications, where their crystalline nature, sharp melting point and marked fluidity, in the molten state, results in faithful reproduction of the mold. Molded products, for use as containers, may be produced from powders obtained pursuant to the present invention; and, also, many mechanical and other engineering parts and materials, such as gears, cams, bearings, and similar machine components may be produced from them. In the electrical arts, the products of the present invention are useful as a coating on wire, etc., as an insulation, and for the production of certain mechanical, electrical parts, such as insulating bushings, fuse holders, and the like. The products are also of interest in the coating arts as finishes for textiles, paper and similar fibrous materials, and for use as special adhesives and other coatings.

It should also be understood that the products of the present invention may be compounded in many applications with other synthetic plastic materials, plasticizers and fillers. Among the plasticizers, which have been found to be compatible with the products of the present invention, may be mentioned, o- and p-toluenesulfonamide, N-ethyl o- and p-toluenesulfonamide, ethylene carbonate and propylene carbonate.

While the production of polymers of 2-pyrrolidone and 2-piperidone has specifically been described in the foregoing examples it will be apparent that the process of the present invention may be employed for the production of polymers of homologues of 2-pyrrolidone and 2-piperidone which contain a lower alkyl (1–4 carbon atoms) substituent on the carbon atoms in the ring. Such alkyl substituted pyrrolidones and piperidones which have been found to be most readily polymerized by the process of this invention are those in which certain alkyl substituents in 3 and 4 position such as 3-methyl-2-pyrrolidone, 4-methyl-2-pyrrolidone, 4-ethyl-2-pyrrolidone, 3.3-dimethyl-2-pyrrolidone, 4,4-dimethyl-2-pyrrolidone, 3-methyl-2-piperidone, and 3-ethyl-2-piperidone. The alkyl substituted pyrrolidones and piperidones may be represented by the general formula

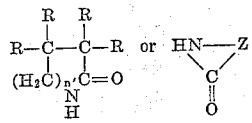

wherein Z represents

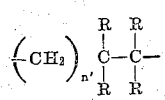

where $n'$ is one of the integers 1 and 2 and the R's represent a member of the group consisting of H and lower alkyl groups of 1 to 4 carbon atoms. The polymeric unit of the polymers produced on polymerizing them in accordance with the present invention may thus be represented by the general formula

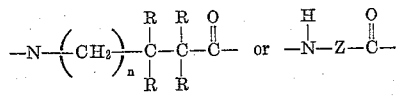

We claim:
1. In the process of polymerizing lactams of the formula:

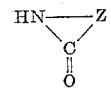

wherein Z represents

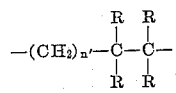

wherein $n'$ is an integer from 1 to 2 and R represents a member of the group consisting of H and lower alkyl (1–4 carbon atoms), comprising polymerizing said lactam in the presence of a minor amount up to about 10 mole percent based on said lactam of an alkali metal lactam as the polymerization catalyst; the improvement which comprises effecting said polymerization under essentially anhydrous conditions and in the presence of a minor amount up to about 10 mole percent based on said lactam of a polymerization chain initiator consisting essentially of an N,N-disubstituted sulfonamide of the formula

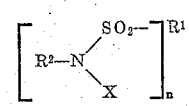

wherein $R^1$ represents a member of the group consisting of hydrocarbon radicals of valence $n$ and alkylene bivalent radical joined to bivalent X; $R^2$ represents a member of the group consisting of alkyl and aryl radicals and bivalent alkylene radical joined to bivalent X, provided, however, that only one of $R^1$ and $R^2$ may be such a bivalent alkylene radical; X is a member of the group consisting of alkylsulfonyl, arylsulfonyl, acyl, carbalkoxy, and carbanilino groups and a bivalent keto carbonyl group joined to one of the bivalent $R^1$ and $R^2$ groups specified above; and $R^2$ and X when bivalent form with the N atom to which they are attached a lactam ring and $R^1$ and X when bivalent form with the S and N atom to which they are respectively attached a heterocyclic ring and $n$ is an integer from 1 to 3.

2. In the process of polymerizing lactams of the formula

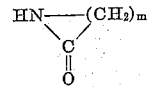

wherein $m$ is an integer from 3 to 4, comprising polymerizing said lactam in the presence of a minor amount up to about 10 mole percent based on said lactam of an alkali metal lactam as the polymerization catalyst; the improvement which comprises effecting said polymerization under essentially anhydrous conditions and a minor amount up to about 10 mole percent baesd on said lactam of a polymerization chain initiator consisting essentially of an N,N-disubstituted sulfonamide of the formula

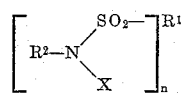

wherein $R^1$ represents a member of the group consisting of hydrocarbon radicals of valence $n$ and alkylene bivalent radical joined to bivalent X; $R^2$ represents a member of the group consisting of alkyl and aryl radicals and bivalent alkylene radical joined to biavlent X, provided, however, that only one of $R^1$ and $R^2$ may be such a bivalent alkylene radical; X represents a member of the group consisting of alkylsulfonyl, arylsufonyl, acyl, carbalkoxy, and carbanilino radicals and a bivalent keto carbonyl group joined to one of the bivalent $R^1$ and $R^2$ groups specified above; and $R^2$ and X when bivalent form with the N atom to which they are attached a lactam ring and $R^1$ and X when bivalent form with the S and N atom to which they are respectively attached a heterocyclic ring and $n$ is an integer from 1 to 3.

3. The process as defined in claim 2, wherein the polymerization chain initiator specified has the formula:

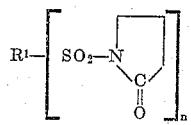

4. A process as defined in claim 2, wherein the polymerization chain initiator specified is formed in situ, in the solution of the alkali pyrrolidone in pyrrolidone by adding thereto an organic sulfonyl halide.

5. A process as defined in claim 4, wherein the organic sulfonyl halide is benzensulfonyl chloride.

6. A process as defined in claim 4, wherein the benzenesulfonyl halide is 1,5-naphthalene disulfonyl chloride.

References Cited in the file of this patent

Noble: Doctoral Dissertation Series, publ. No. 22,623 (1956), Ph. D. Thesis at U. of Colorado, pp. 40–48.